(12) United States Patent
Lawler et al.

(10) Patent No.: US 6,236,179 B1
(45) Date of Patent: May 22, 2001

(54) CONSTANT POWER SPEED RANGE EXTENSION OF SURFACE MOUNTED PM MOTORS

(75) Inventors: Jack Steward Lawler; John Milton Bailey, both of Knoxville, TN (US)

(73) Assignee: Lockheed Martin Energy Research Corporation, Oak Ridge, TN (US)

( * ) Notice: Subject to any disclaimer, the term of this patent is extended or adjusted under 35 U.S.C. 154(b) by 0 days.

(21) Appl. No.: 09/507,057

(22) Filed: Feb. 21, 2000

(51) Int. Cl.$^7$ ........................................... H01R 39/46
(52) U.S. Cl. .................. 318/439; 318/254; 318/138; 318/376; 318/375; 318/599; 388/812
(58) Field of Search ...................... 318/254, 138, 318/439, 376, 375, 599; 388/812

(56) References Cited

U.S. PATENT DOCUMENTS

| | | | |
|---|---|---|---|
| 5,619,109 | * 4/1997 | Cameron et al. ................ | 318/375 |
| 5,677,605 | 10/1997 | Cambier et al. ................ | 318/254 |
| 5,912,522 | * 6/1999 | Rivera ............................ | 310/184 |

* cited by examiner

*Primary Examiner*—Karen Masih
(74) *Attorney, Agent, or Firm*—Quarles & Brady LLP

(57) ABSTRACT

A circuit and method for controlling a rotating machine (11) in the constant horsepower range above base speed uses an inverter (15) having SCR's (T1–T6) connected in series with the primary commutation switches (Q1–Q6) to control turn off of the primary commutation switches and to protect the primary commutation switches from faults. The primary commutation switches (Q1–Q6) are controlled by a controller (14), to fire in advance or after a time when the back emf equals the applied voltage, and then to turn off after a precise dwell time, such that suitable power is developed at speeds up to at least six times base speed.

17 Claims, 11 Drawing Sheets

US 6,236,179 B1

CONSTANT POWER SPEED RANGE EXTENSION OF SURFACE MOUNTED PM MOTORS

STATEMENT REGARDING FEDERALLY SPONSORED RESEARCH

The U.S. Government has a paid-up license in this invention and right in limited circumstances to require that the patent owner license others on reasonable terms as provided for by the terms of Contract No. DE-AC05-96OR22464 awarded by the U.S. Department of Energy to Lockheed Martin Energy Research Corporation.

TECHNICAL FIELD

The field of the invention is motor controls for permanent magnet AC synchronous motors and brushless DC motors.

BACKGROUND OF THE INVENTION

AC synchronous motors and brushless DC motors are controlled through commutation of solid state switching devices connected to their stator windings. These motors can be of the permanent magnet (PM) type in which permanent magnets are used on the rotor instead of rotor windings. As the speed of the rotor increases, the voltage developed in the stator (referred to as the "back emf") increases. This, in turn, requires that higher and higher terminal voltages be applied to produce the desired torques. Base speed is that speed which is at the top of the constant torque range and at the beginning of the constant horsepower range. In many uses, it is desirable to limit terminal voltage at a certain speed and yet maintain a constant horsepower over a certain speed range above base speed. The ratio of the highest speed that can be attained to the base speed at which the limit of terminal voltage is reached is termed the constant power speed ratio. Attaining a desired constant power speed ratio is made more difficult when the motor inductance is in the microhenry range.

PM motors with interior mounted magnets (IPMs) have been shown to have constant power speed ratios of 7.5:1. However, these types of PM motors are not commercially available.

In traction devices such as electric vehicles, the torque-speed specifications call for a constant torque up to some base speed, and then constant horsepower operation up to a higher speed. PM electric motors with rare earth surface-mounted permanent magnets are viable candidates for such applications due to their power density and efficiency. These motors are electrically commutated and are driven by inverters.

Camber et al., U.S. Pat. No. 5,677,605, issued October 14, 1997, discloses a drive system for a brushless DC motor which uses PWM inverter, and phase timing advancement to control operation in the constant power range above base speed. This patent discloses a three-phase brushless DC motor driven by a six-step PWM drive. The commutation switches include IGBT's and MOSFET's for the primary switching devices in parallel with bypass diodes.

As speed increases and commutation takes place at a rapid rate, this arrangement may allow for continuous conduction of the phase current and conduction by the bypass diodes at undesirable times, leading to the loss of power and efficiency. The inverter and the motor may heat up, thereby requiring additional cooling measures.

SUMMARY OF THE INVENTION

The present invention is applied to a surface-mounted PM motor, either the AC-type PM synchronous motor (PMSM) or the DC-type brushless dc motor (BDCM), with operation at speeds well above base speed and with low motor inductances.

The present invention utilizes commutation control switches, which can be pairs of thyristors, or individual triacs or equivalents of these, which are connected to the primary commutation switches to stop conduction of current at the zero crossing and to block currents generated by the induced emf when the motor is operating above base speed. The present invention also utilizes a particular phase advance switching sequence to control the conduction of the primary commutation switches in the inverter, by controlling the firing angles and conduction periods of the primary commutation switches and the commutation control switches added to the inverter.

The present invention allows a smooth transition using standard pulse-width modulation techniques from below base speed to high speed operation above base speed.

The invention is operable up to at least six (6) times base speed (6:1 constant horsepower speed range ratio), but is applicable for attaining even higher speeds.

The present invention provides increased reliability due to the isolation capability of the commutation control switches.

The present invention is applicable to surface mounted PM machines with either trapezoidal or sinusoidal back emfs.

The present invention is applicable when the motor is operated in either a motoring mode or a regenerating mode above base speed.

Other objects and advantages of the invention, besides those discussed above, will be apparent to those of ordinary skill in the art from the description of the preferred embodiments which follow. In the description, reference is made to the accompanying drawings, which form a part hereof, and which illustrate examples of the invention. Such examples, however, are not exhaustive of the various embodiments of the invention, and therefore, reference is made to the claims which follow the description for determining the scope of the invention.

DETAILED DESCRIPTION OF THE INVENTION

Figure 1:
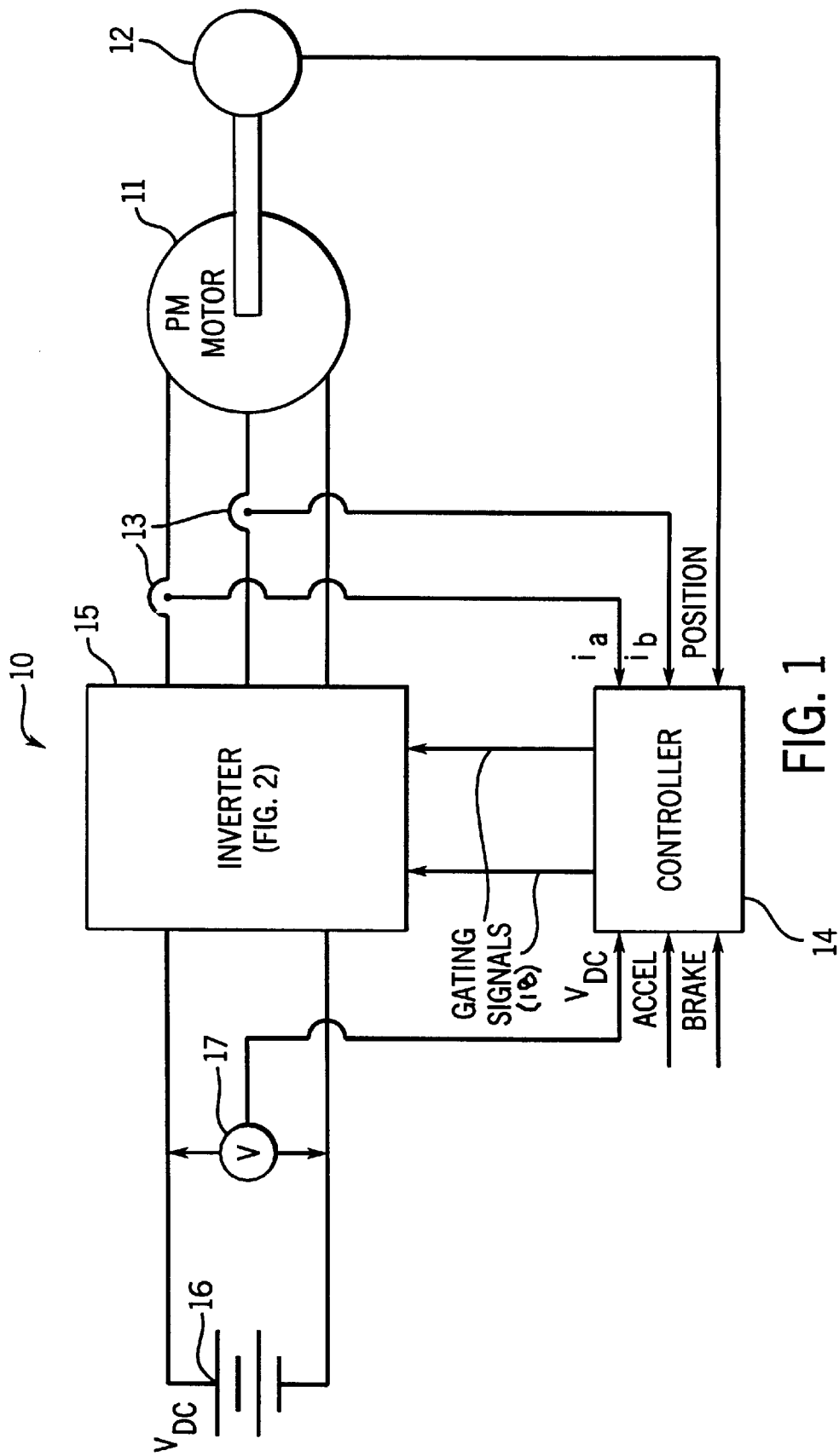
FIG. 1 is a block diagram of the motor control of the present invention connected to control a brushless DC motor.

Referring to FIG. 1, the present invention is embodied in a motor control system 10 for controlling a surface mounted permanent magnet (SPM) motor 11, which in this embodiment is a brushless DC motor. There are two types of permanent magnet motors available, one with magnets embedded in the interior of the rotor (IPM), and the other with magnets at the surface of the rotor, i.e., surface mounted magnets (SPM). The voltage induced in the stator by the rotating magnets in the rotor is termed the back emf and its waveform can be either sinusoidal in the case of a permanent magnet synchronous motor (PMSM) or trapezoidal in shape, in the case of the brushless DC motor (BDCM) 11.

The magnets are formed of rare earth magnetic materials, such as NdFeB (neodymium-iron-boron), and produce a very large magnetic field in the air gap. As a result, the coils of the stator in an SPM motor may have fewer turns than a conventional electric motor. This configuration leads to greater power density. And, the inductance of an SPM motor can be low, in the microhenry ($\mu$H) range. In contrast, motors with interior mounted permanent magnets (IPM) or buried magnets, exhibit saliency. These motors have two magnetic paths across the air gap. The buried magnets make the IPM motor more expensive than the SPM motor. In either case, when the motor speed passes the base speed, the back emf becomes larger than the voltage applied by the inverter.

The present invention allows the commercially available surface mounted PM motor or the brushless DC motor (which has the highest power density of the three types) to overcome this problem even with low inductances, and to maintain a constant horsepower operation over a wide speed range (6:1 or higher) while maintaining rated losses.

FIG. 1 shows a motor 11 to be controlled in accordance with the present invention. A position sensor 12 is coupled to the motor output shaft to provide position information. Current sensors 13 are connected to two of the three phases supplying the motor, and to a logic controller 14 to provide current feedback signals to the controller 14. The controller 14 controls the firing of switches for three phases in a dual mode inverter 15 through gating signals 18. The inverter 15 receives DC power from a source 16 and converts this power via pulse width modulation (PWM) to provide AC or DC signals to the motor 11 in response to an acceleration (ACCEL) command and a BRAKE command. The commutation of switches in the inverter 15 is controlled by the controller 14, which senses the DC supply voltage through a suitable voltage sensor 17.

The logic controller 14 preferably includes a microelectronic CPU and associated program memory and data memory. A program is stored in the program memory and is executed by the controller 14 to perform a current control loop and other control methods which are well known in the art of motor control. In addition, the controller 14 will time the conduction of switches in the inverter 15 according to the present invention to be explained below.

Figure 2:
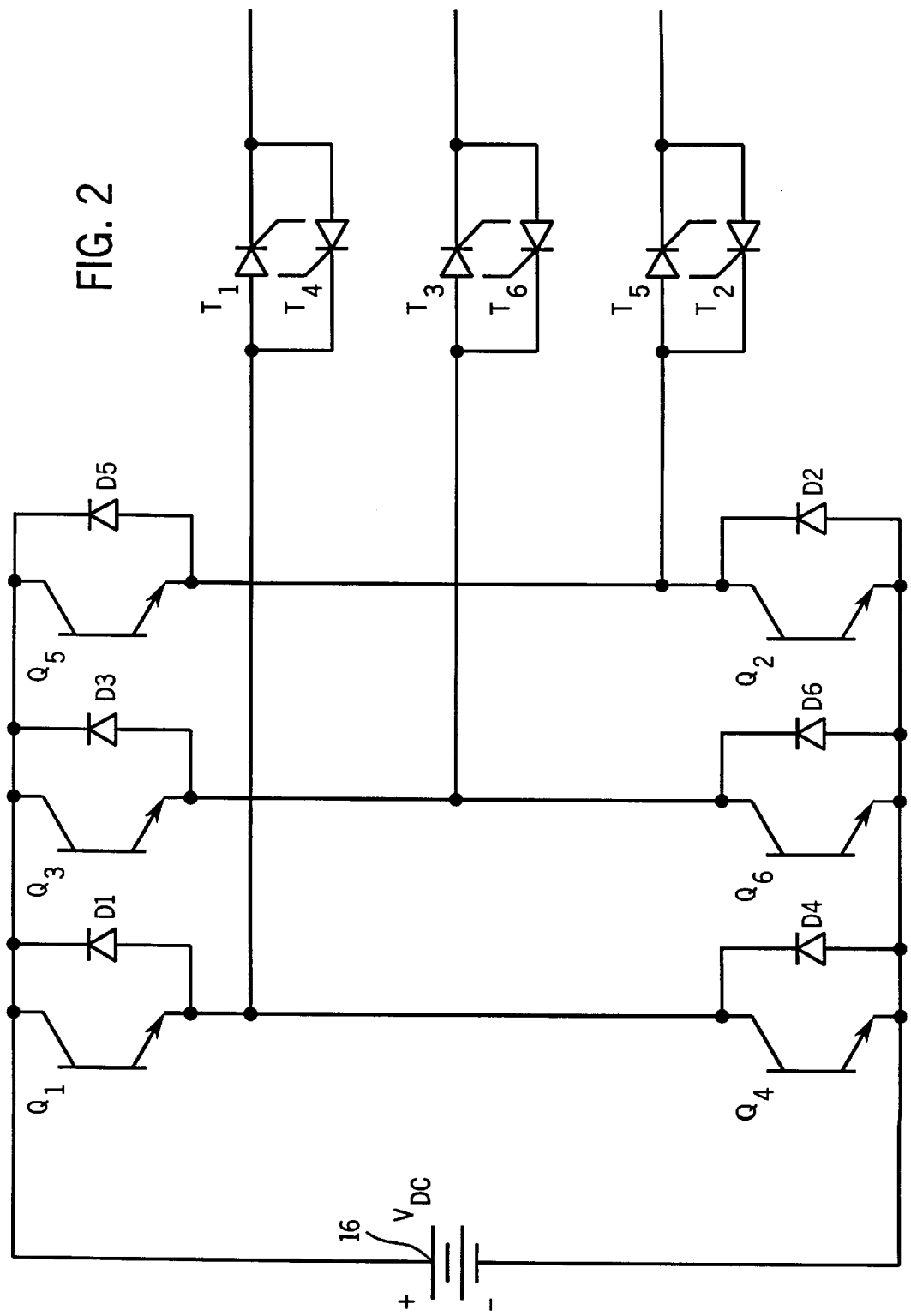
FIG. 2 is detailed electrical schematic of the dual mode inverter seen in FIG. 1.

As shown in FIG. 2, the primary commutation switches are preferably IGBT's (insulated gate bipolar transistors) Q1–Q6 which switch at appropriate intervals. Bypass diodes D1–D6 are connected in parallel to and across each respective IGBT Q1–Q6. The bypass diodes D1–D6, in general, allow transient currents associated with commutation to bypass the IGBT's. Pairs of thyristors, T1 and T4, T2 and T5 and T3 and T6, have been connected in opposite polarity in parallel to each other, with each respective pair in series with two of the primary switching transistors Q1–Q6. One function of the thyristors T1–T6 is to block the current which may be conducted by the bypass diodes D1–D6 during certain phases of the commutation sequence. The thyristors T1–T6 also provide isolation and fault protection for the IGBT's Q1–Q6 and the diodes D1–D6 in the inverter 15.

Figure 3:
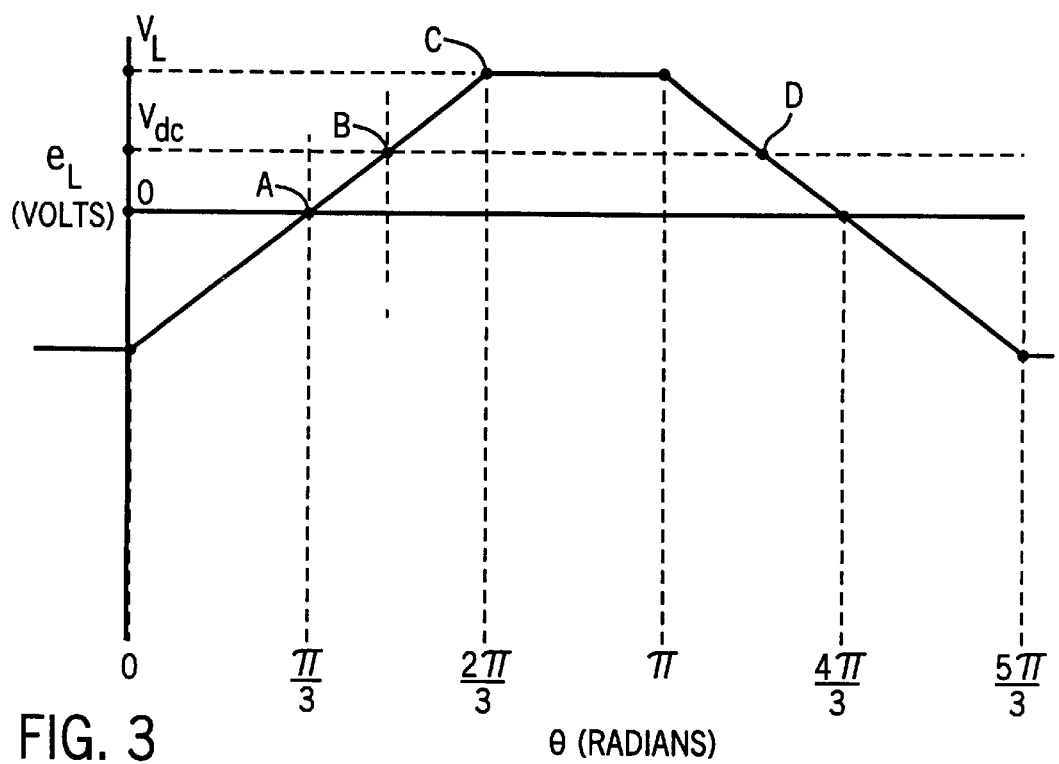
FIG. 3 is a graph of trapezoidal back emf vs. time in a range above base speed.

FIG. 3 shows a graph of a line-to-line voltage for the back emf $e_L$ of one phase pair of the three-phase motor 11. Point A is the "zero crossing" angle. Points B and D are the angles at which the line-to-line back emf, $e_L$, is equal to the dc voltage, $V_{dc}$, supplied to the inverter 14. Point C is the maximum line-to-line back emf $V_L$.

Figure 4:
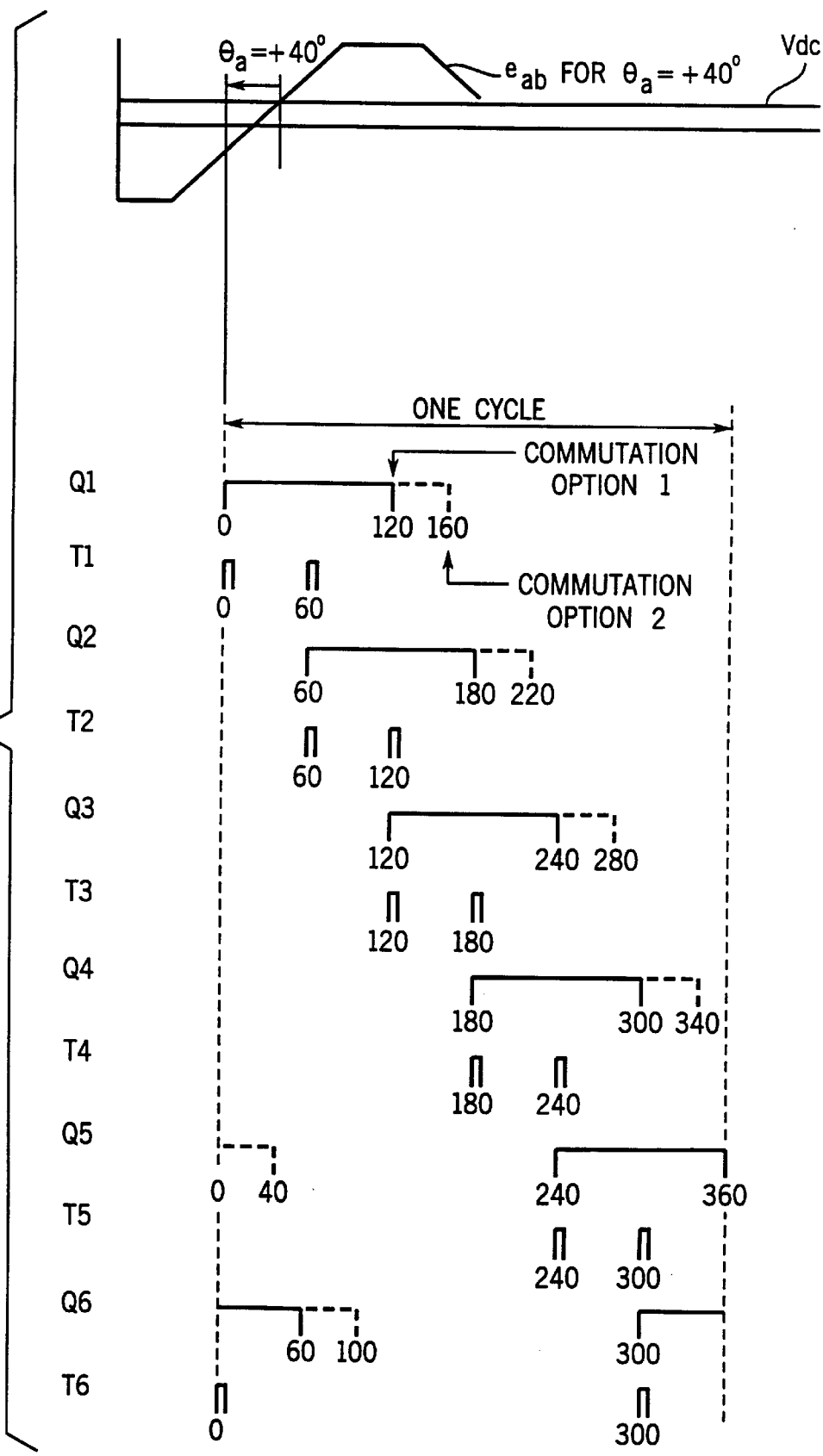
FIG. 4 is a timing diagram of a firing sequence for the switches in the inverter of FIG. 2.

As used herein the term "base speed", $\omega_B$, means the highest speed at which rated torque is obtained and "n" shall be a relative speed with respect to base speed, which is expressed as follows:

$$n = \frac{\omega}{\omega_B}$$

where
$\omega$=actual speed in radians/sec.
The back emf is expressed as follows:
$e_\phi$=back emf phase voltage and
E=$e_\phi$ at the speed $\omega_B$ When the back emf magnitude becomes larger than $V_{dc}$, current must be injected into the stator windings of the motor 11 at some angle before point B. An advance angle $\theta_a$ is illustrated in FIGS. 3 and 4 as an angle preceding the intersection $V_{dc}$ and $e_L$, which occurs at point B in FIG. 3. The advance angle is provided in a range from zero to sixty degrees and controls the developed power as explained further below.

The advance angle firing sequence for phases A, B and C then becomes:

$$\text{PHASE A} \begin{cases} Q_1 \text{ is fired } \theta_a \text{ degrees before } e_{ab} = V_{dc} \\ Q_4 \text{ is fired } \theta_a \text{ degrees before } e_{ba} = V_{dc} \end{cases}$$

$$\text{PHASE B} \begin{cases} Q_3 \text{ is fired } \theta_a \text{ degrees before } e_{bc} = V_{dc} \\ Q_6 \text{ is fired } \theta_a \text{ degrees before } e_{cb} = V_{dc} \end{cases}$$

$$\text{PHASE C} \begin{cases} Q_5 \text{ is fired } \theta_a \text{ degrees before } e_{ca} = V_{dc} \\ Q_2 \text{ is fired } \theta_a \text{ degrees before } e_{ac} = V_{dc} \end{cases}$$

$\theta_b$="Blanking Angle"=60° for commutation option #1;
=20° or less for commutation option #2.

The blanking angle represents that time that occurs between the turning off on one transistor Q1–Q6 in a phase pair of transistors and the turning on of the other transistor in each phase pair. Transistor dwell periods are expressed as follows:

Dwell =180°−$\theta_b$

Two commutation examples will be discussed, one with a blanking angle of 60°, which is utilized when running at about base speed, and another example of a blanking angle of 20°, which is utilized when running at (1.5×base speed). For these examples:

$\theta_b$ = 60°  $n < n_{crit}$ = 1.5 (commutation option #1)

= 20°  $n \geq n_{crit}$ = 1.5 (commutation option #2)

Commutation option #2 above base speed produces approximately 7% more power than commutation option #1 for the same current.

The switch firing sequence for the inverter 14 for firing the thyristors (connected to phases a, b and c) can then be expressed as follows:

PHASE A $\begin{cases} T1 \text{ is fired coincident with } Q1 \ \& \ Q2 \\ T4 \text{ is fired coincident with } Q4 \ \& \ Q5 \end{cases}$ PHASE B $\begin{cases} T3 \text{ is fired coincident with } Q3 \ \& \ Q4 \\ T6 \text{ is fired coincident with } Q1 \ \& \ Q6 \end{cases}$ PHASE C $\begin{cases} T5 \text{ is fired coincident with } Q5 \ \& \ Q6 \\ T2 \text{ is fired coincident with } Q2 \ \& \ Q3 \end{cases}$ The combination of the firing angles, dwell angles and firing sequence is illustrated in FIG. 4. Each phase-to-neutral voltage, an, bn and cn has a positive firing direction, a+, b+, and c+ and a negative firing direction, a−, b− and c−. Each of the six primary commutating switches Q1–Q6 is fired in sequence by causing conduction in pairs of thyristors, T1–T6 which will allow firing of only a unique one of the six switches Q1–Q6. As seen in FIG. 4, for every 60°, one transistor and two thyristors are fired or caused to conduct by proper gating signals. The transistor dwell period of 120° is shown in solid lines for the commutation option #2 (60° blanking angle), which is extended to 160° as shown by the dashed lines for commutation option #1 (20° blanking angle).

At speeds only slightly greater than base speed, commutation option #1 may not result in the outgoing phase current reaching zero before the time that the phase is to be switched back into service. This results in a "commutation failure" which is not catastrophic but which does reduce the average output power and increase the RMS current. Which commutation option is used depends simply on the width of the gate commands of the transistors Q1–Q6. In commutation option #2, the commanded transistor conduction or dwell period is 160° out of 360°, while in option 1 the conduction or dwell period is 120° out of 360°. By adjusting the base commands of the transistors between 120° and 180°, commutation failures can be avoided while maintaining the highest possible energy conversion efficiency.

For the motoring mode, the angles of firing are with reference to point B in FIG. 3. For the regenerating mode, the angles of firing are with reference to point D in FIG. 3.

A conventional inverter of the prior art would include the transistors Q1–Q6 and the diodes D1–D6, but not the thyristors T1–T6 shown in FIG. 2. In the prior art, during the driving of a brushless DC motor (BDCM), there are, at any given time, two phases whose back emfs (having a trapezoidal waveform) are saturated, one in the positive direction and the other in the negative direction, while the third phase is undergoing transition (either from the most negative value to the most positive value or vice versa). The conventional approach for driving the BDCM is to energize the two phases having back emfs which are at the peak values while the third phase is left to idle.

Figure 5A:
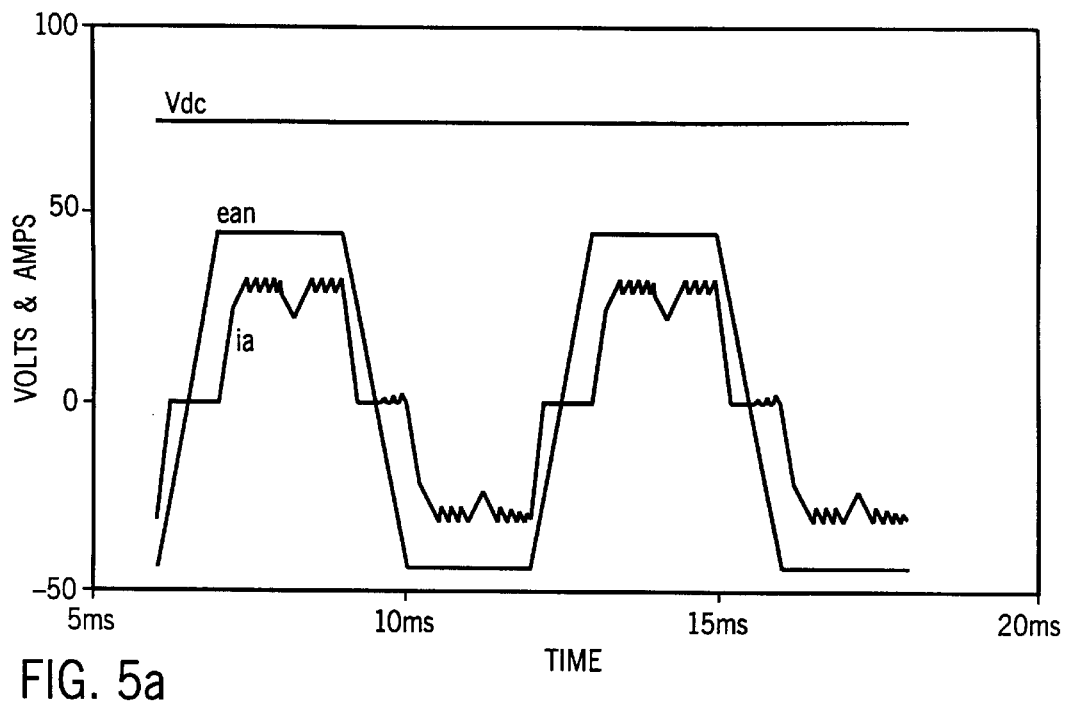
FIGS. 5a and 5b are graphs of voltage and current vs. time for operation below base speed.
Figure 5B:
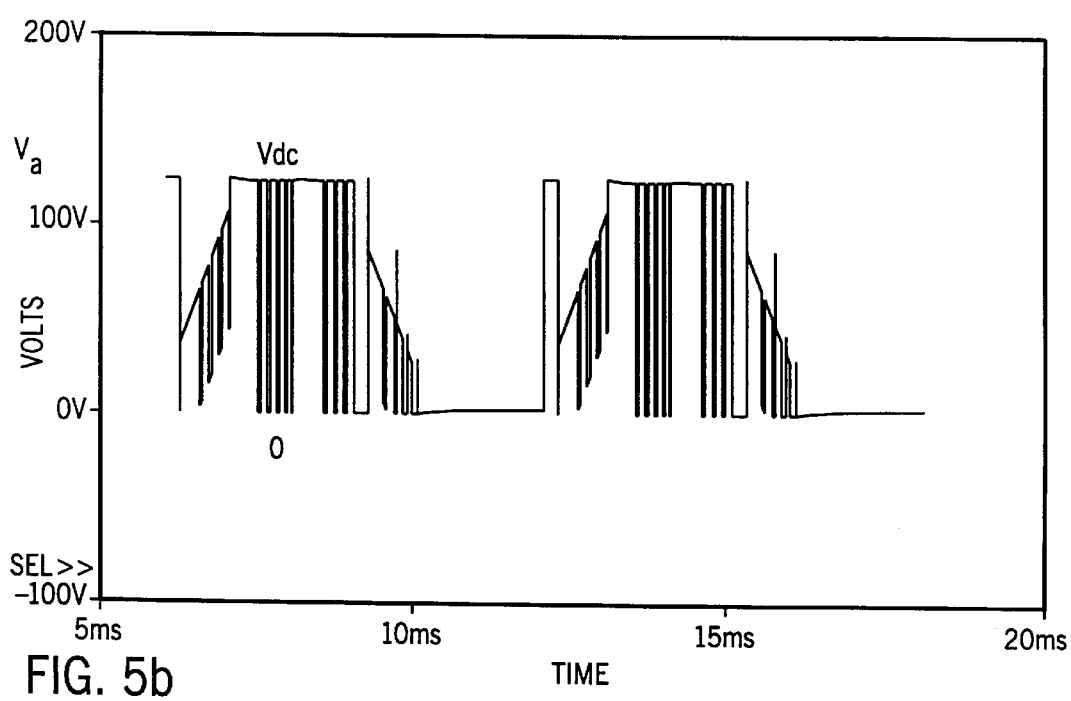

FIG. 5a shows the DC supply voltage, $V_{dc}$, the phase back emf, $e_{an}$, and a phase current waveform, $i_a$, that are typical of the below base speed operation of the BDCM of the prior art. Waveforms for phases b and c would be similar but shifted by one third and two thirds of a cycle, respectively. Also shown in FIG. 5b is the waveform of a phase-to-ground voltage, $V_a$, for "phase a" formed by output pulses of the PWM type. When "phase a" is idling, the potential at the motor terminals is floating based on the time value of the internal voltage. Since the transistors Q1 and Q4 in FIG. 2 are off during this time, there is no conduction through the bypass diodes D1 and D4 since both diodes are back-biased. Thus, below base speed, the inverter of the prior art would be capable of a tri-state output; +Vdc (Q1 or D1 in FIG. 2 are ON), 0 (Q4 or D4 in FIG. 2 are ON) or open-circuit (all four "phase a" switches Q1, Q4, D1 and D4 are off).

As the motor speed increases (with higher applied voltage), the potential difference between the DC supply voltage and the internal motor voltage (back emf) decreases. At base speed any further increase in speed would result in insufficient voltage potential to continue to drive the necessary current into the motor windings. At still higher speeds, the back emf is higher than the internal voltage and the machine would tend to shift from the motoring mode to a regenerating mode and the regeneration would have a braking effect to reduce the motoring power that is developed.

Figure 6A:
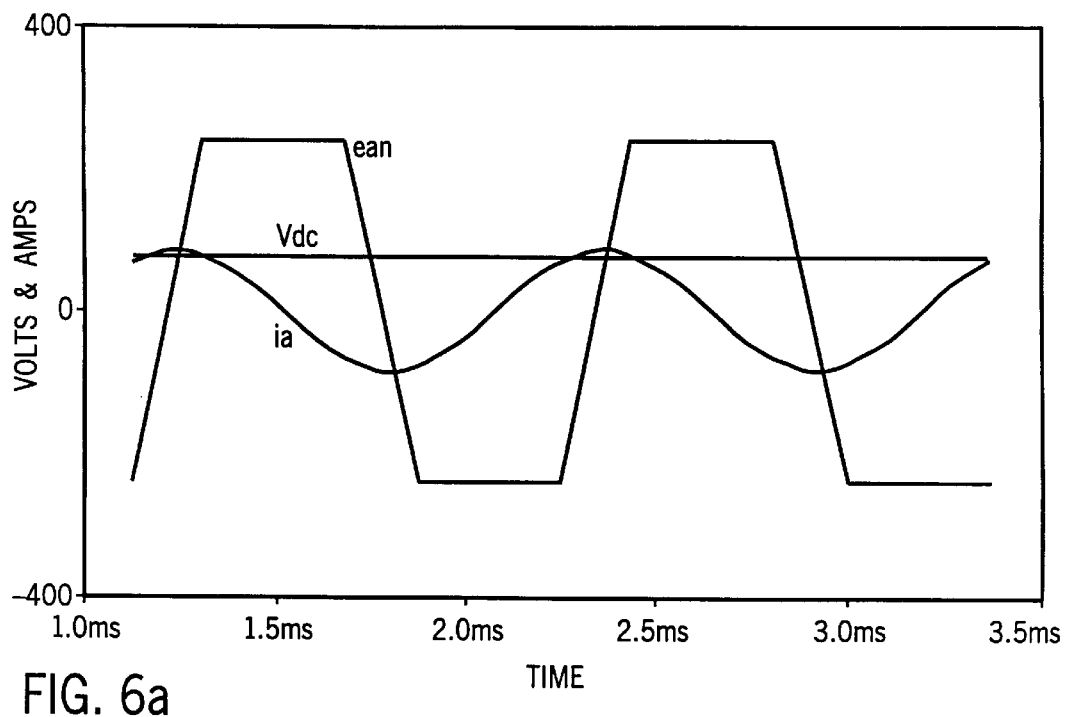
FIGS. 6a and 6b are graphs of voltage and current vs. time for operation above base speed and at full power using a prior art methodology.
Figure 6B:
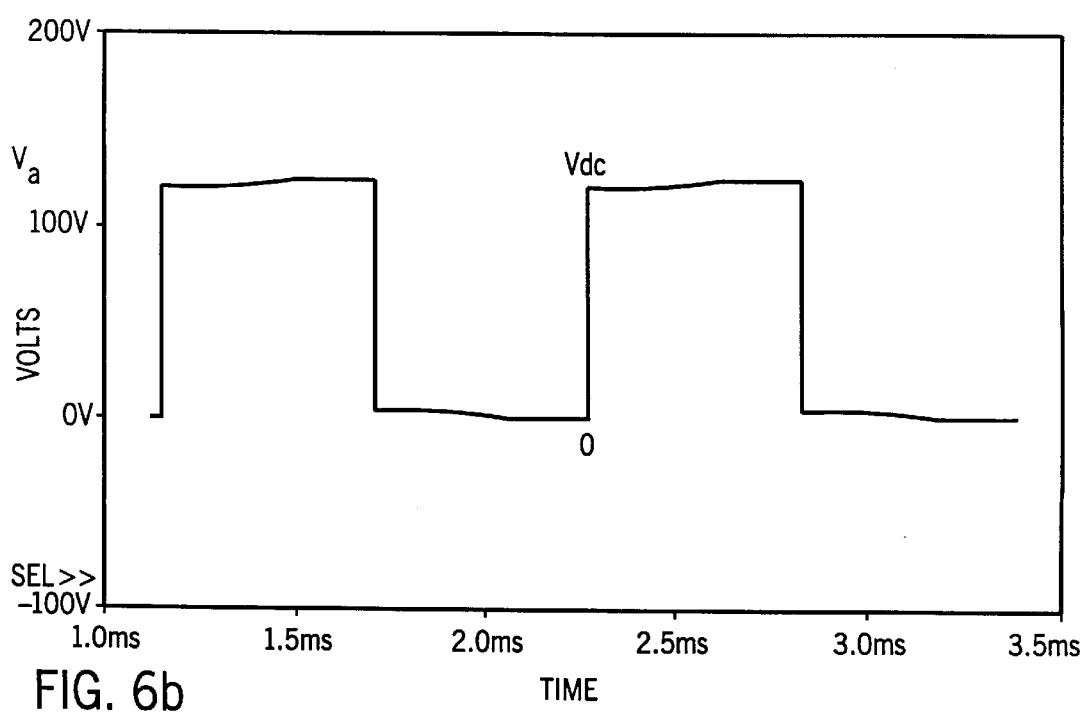
Figure 7A:
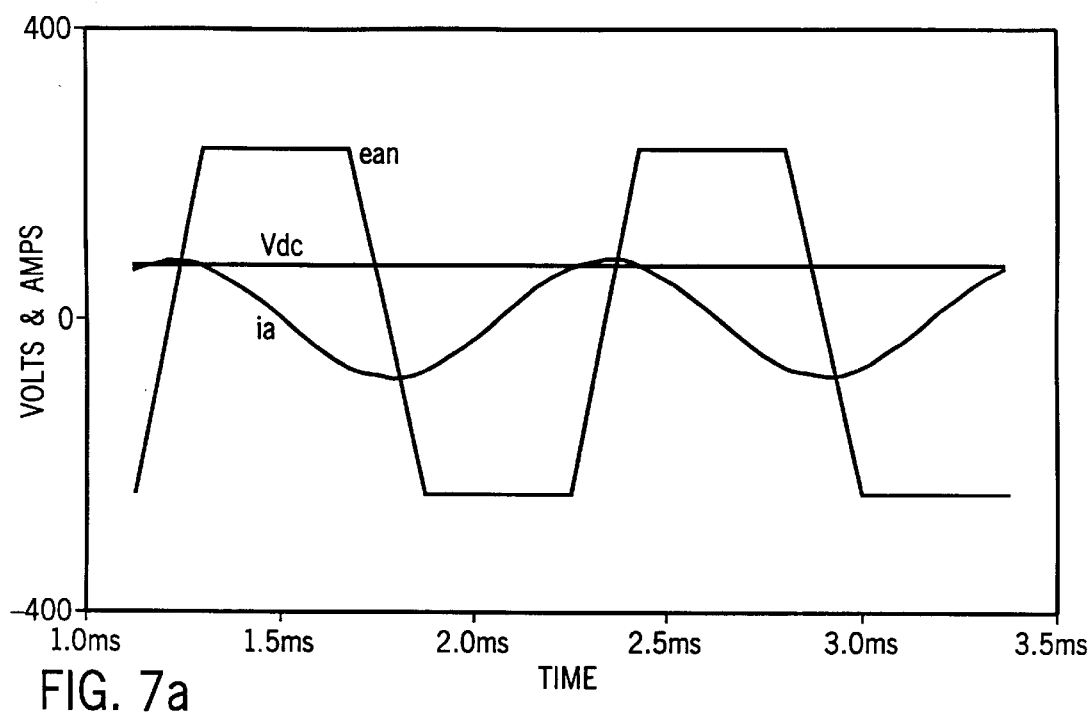
FIGS. 7a and 7b are graphs of voltage and current vs. time for operation above base speed and at half power using a prior art methodology.
Figure 7B:
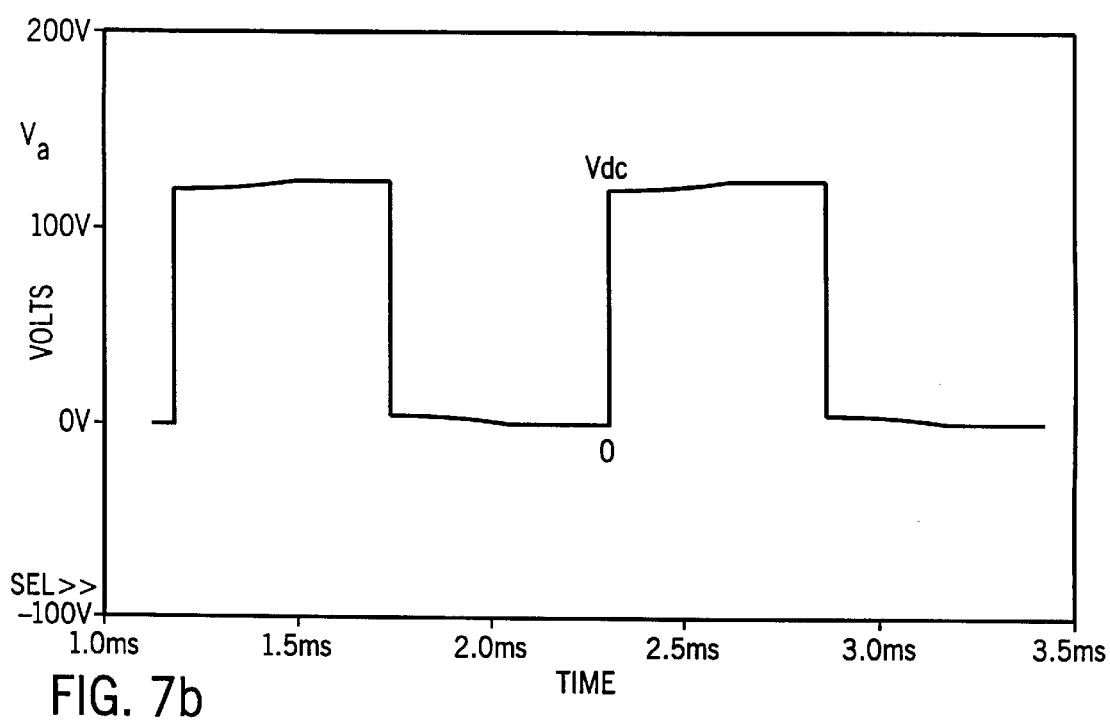

In order to continue to drive current into the motor in the motoring mode, the firing of the phases is "advanced" to apply the DC supply voltage to the incoming (turning on) phase while the motor internal voltage (back emf) is in the transition region. This method is demonstrated in FIGS. 6a and 6b. FIG. 6a shows the supply voltage, $V_{dc}$, the phase back emf, $e_{an}$, and phase current, $i_a$, for one phase for (4× base speed) and full motoring power. FIGS. 6b and 7b show the phase-to-ground voltage, $V_a$, applied to the motor 11. FIG. 7a shows the supply voltage, $V_{dc}$, the phase back emf, $e_{an}$, and phase current, $i_a$, for the same speed but at only one half of rated motor power. The magnitude of the phase current, $i_a$, in both cases is approximately 275% of the rated value required at base speed. This would result in motor losses of 7.5 times greater than the losses at base speed and require that the inverter switches be rated for 2.75 times the current required at base speed and full power.

FIG. 5a shows that below base speed each phase conducts for a little more than two thirds of a cycle (the exact amount depends on the internal inductance). FIG. 6a shows that while in the phase advance mode used above base speed, the conduction tends to be continuous due to the action of the bypass diodes. When the phase current conduction is continuous there are substantial periods of time when the back emf and the current are of opposite sign (resulting in a reduction of average power). When the current conduction is continuous, the inverter output is bipolar and the phase-to-ground voltage is either +Vdc or 0.

The method of the present invention for driving the BDCM 11 above base speed is similar to phase advance but has the following distinct differences due to the use of the inverter configuration of FIG. 2.

First, the current conduction does not become continuous. When a phase current attempts to reverse, conduction is halted by the natural commutation of the appropriate thyristor T1–T6. Thus, periods when phase current and motor emf have opposite sign are reduced, increasing the average power developed (and reducing the magnitude of the required current). The phase-to-ground potential at the motor terminals remains tri-state, +Vdc, 0, or floating to a value, depending on the internal emf of the idling phase.

Second, in the present invention, the waveform of the motor current above base speed has the same basic shape as that below base speed except that proper choice of advance angle completely eliminates the need for high speed switching.

Third, the outgoing phase (the phase being turned off) may be commutated by either of two methods. In commutation option #2, the outgoing phase is left engaged to whichever terminal of the DC supply that it was connected to during conduction and the current naturally tends towards zero due to the fact that the internal voltage is greater than the DC supply voltage. When the current reaches zero, conduction is stopped by the appropriate thyristor T1–T6, which will not conduct in a reverse direction. In commutation option #1 of the present invention, the outgoing phase is switched to the opposite pole of the DC supply 16. The commutation time is slower with the commutation option #2 than with commutation option #1 resulting in greater power being developed.

Figure 8A:
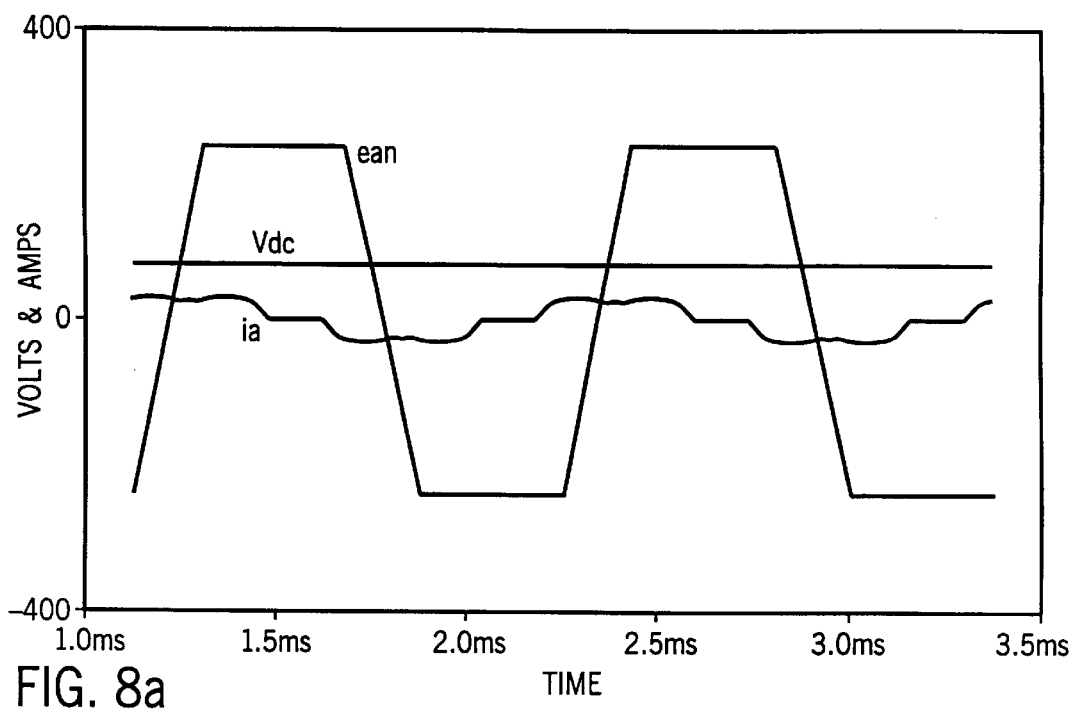
FIGS. 8a and 8b are graphs of voltage and current vs. time for operation above base speed in a motoring mode and at full power using the method of the present invention.
Figure 8B:
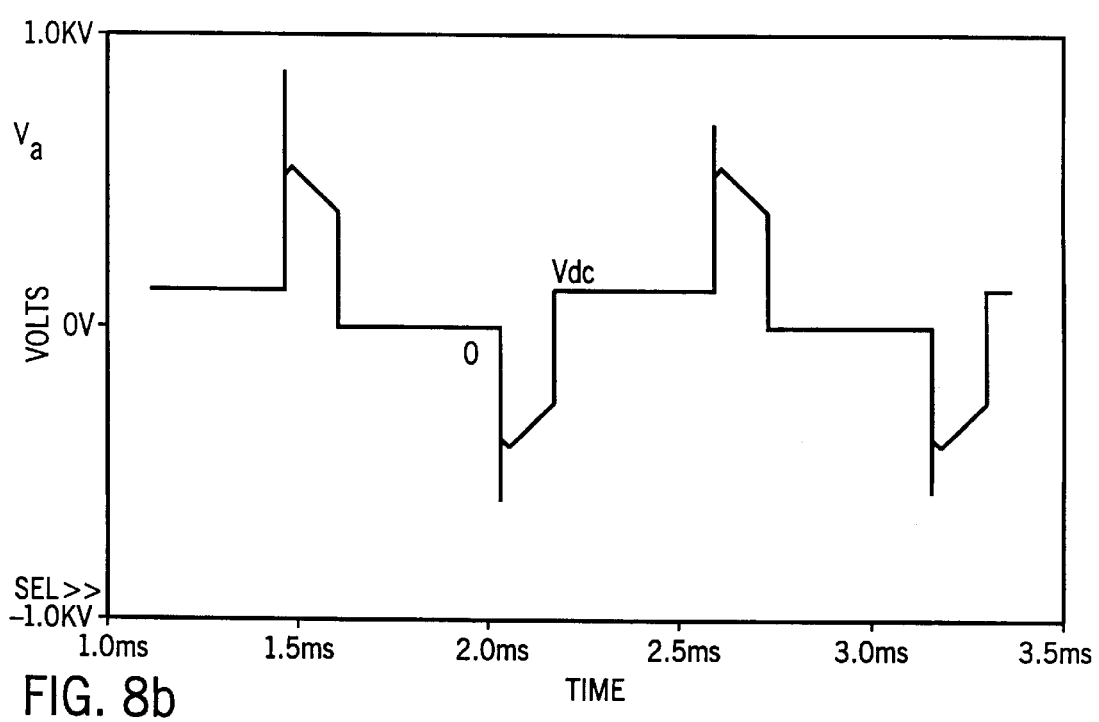
Figure 9A:
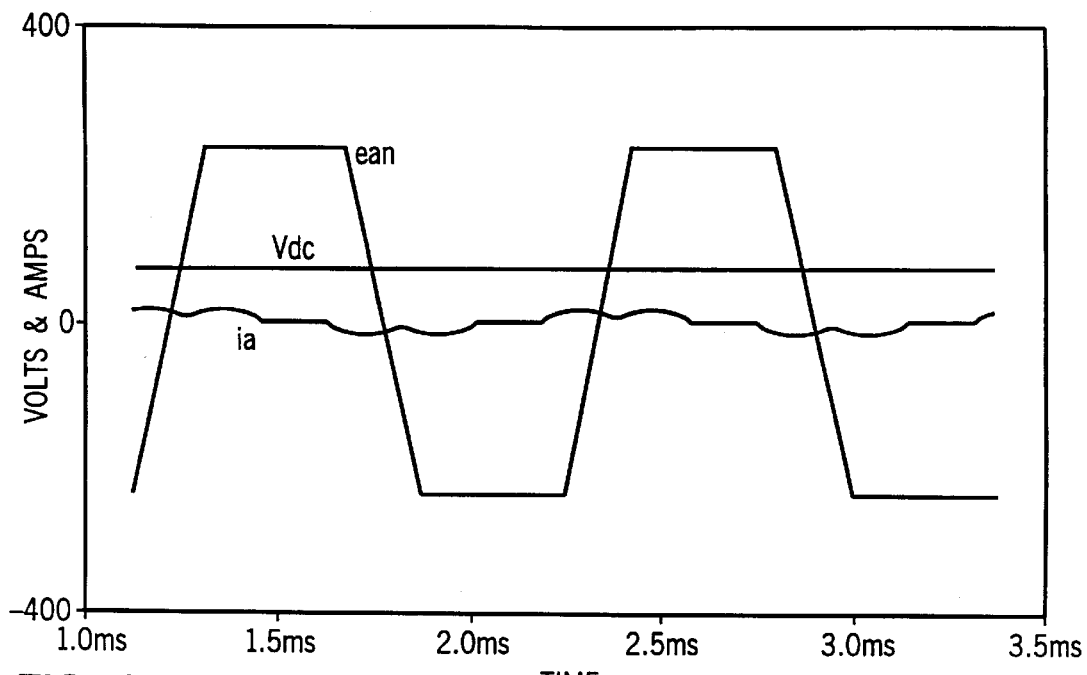
FIGS. 9a and 9b are graphs of voltage and current vs. time for operation above base speed in a motoring mode and at half power using the method of the present invention.
Figure 9B:
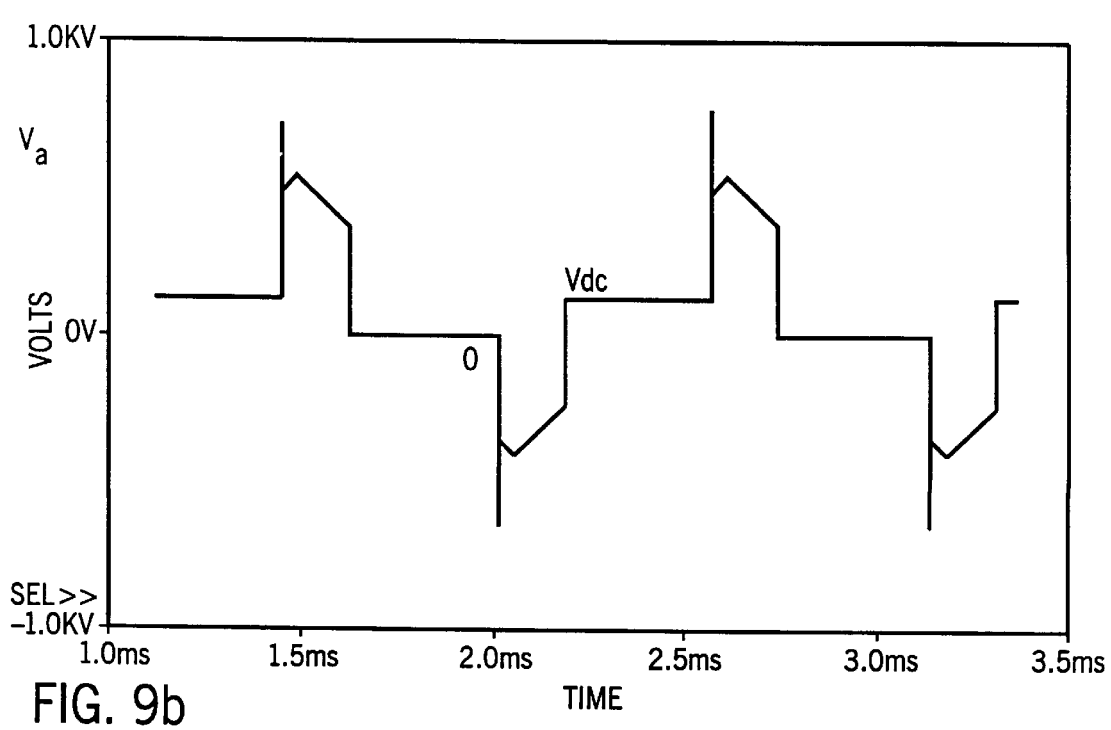

In the present invention, the phase advance is measured relative to the intersection of the value of a phase-to-phase back emf voltage to the value of the DC supply. The greater the advance angle, the greater the power that is produced. FIGS. 8a and 9a show the relevant waveforms for two different advance angles in the motoring mode at (4× base speed). Note that the current magnitude in FIG. 9a which is half of rated power, is only half that of the current magnitude in FIG. 8a which is for full rated power. In contrast, the prior art phase advance method provided a current magnitude in FIGS. 6a and 7a that was insensitive to power level.

Figure 10A:
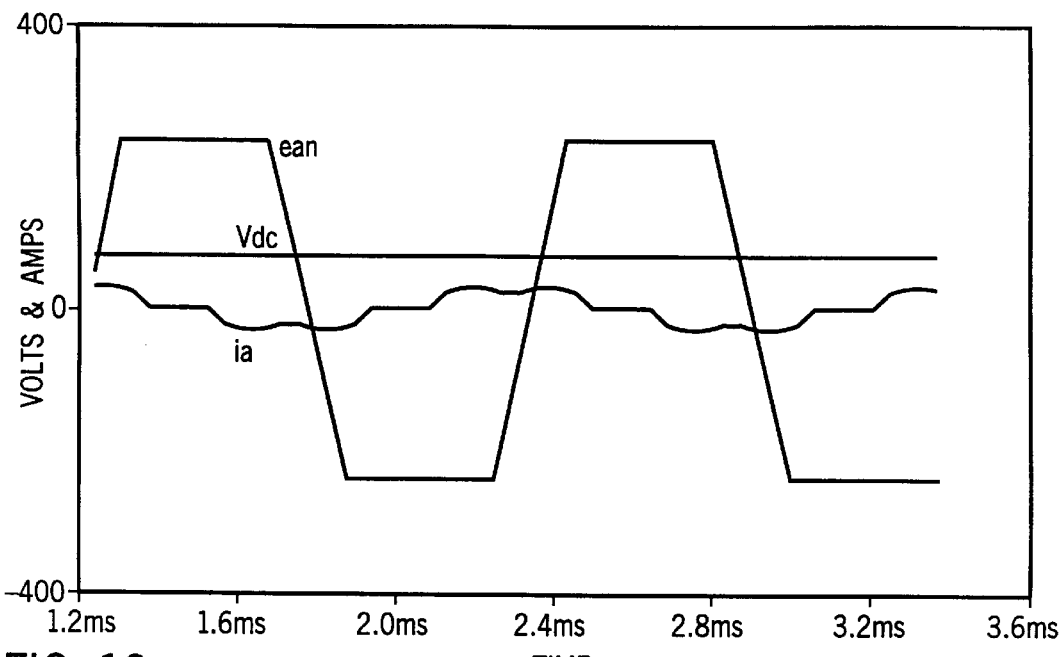
FIGS. 10a and 10b are graphs of voltage and current vs. time for operation above base speed and in a regenerating mode using the method of the present invention.
Figure 10B:
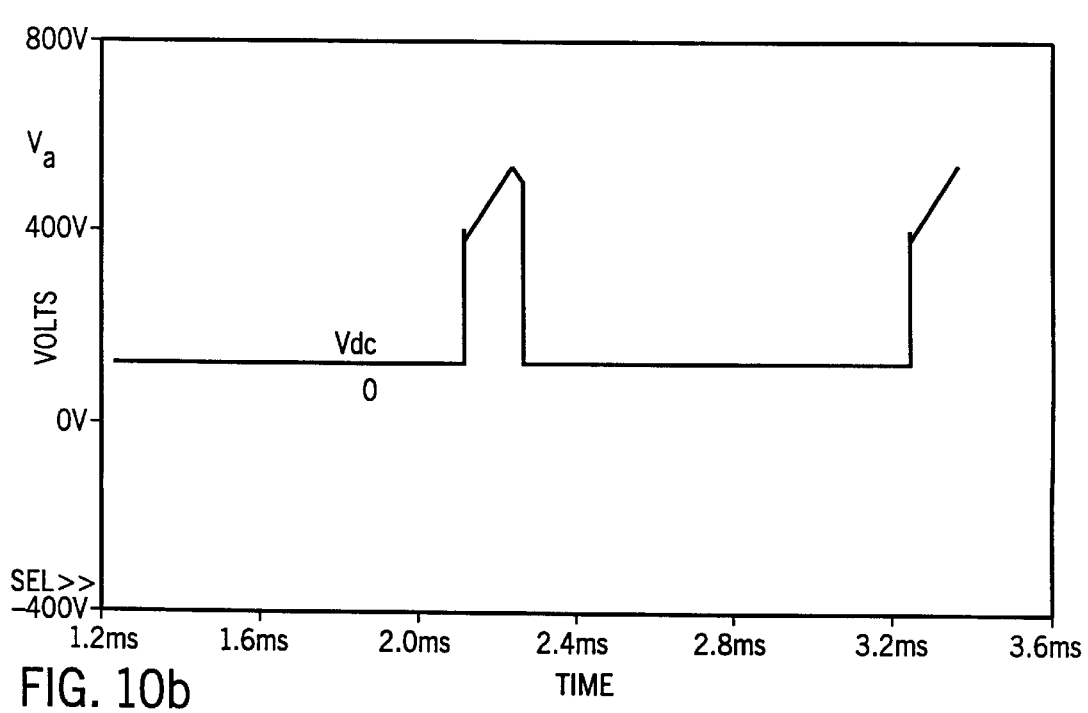

The inverter of FIG. 2 is capable of operating in both a motoring mode and in a regeneration mode. FIG. 10a shows the "phase a" waveforms for regeneration at the full rated power level at (4× base speed). The phase is supplied with a voltage of opposite polarity from the back emf to cause a natural braking of the motor. The current magnitude in the regeneration mode is virtually identical to the current magnitude in the corresponding motoring mode.

Figure 11:
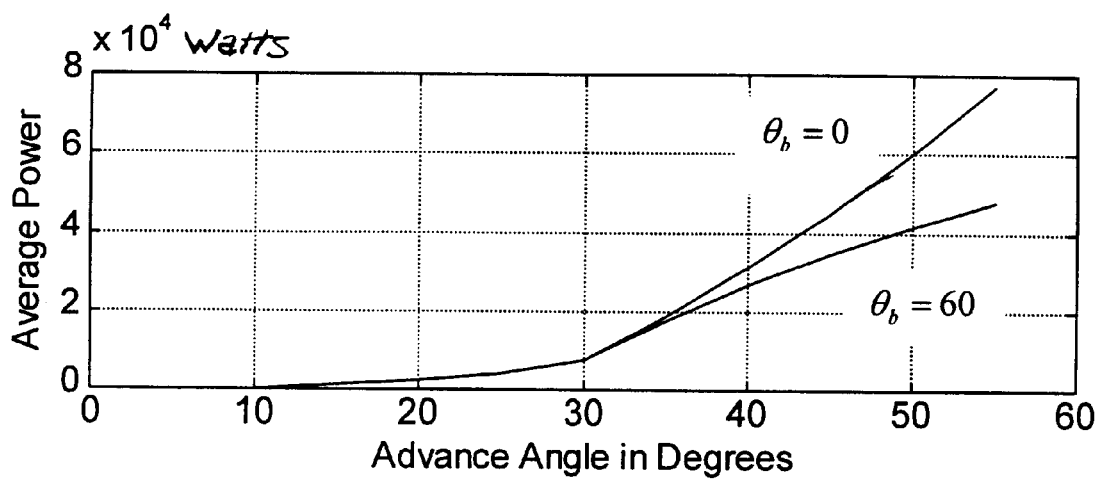
FIG. 11 is a graph of advance angle vs. power for a blanking angle of 0° and 60°, respectively.

FIG. 11 illustrates several features of the relationship between the blanking angle and the advance angle in the present invention. The blanking angle can be sixty degrees at just above base speed, but as speed is increased the blanking angle can be reduced to increase developed power. For advance angles up to thirty degrees this does not have an effect on power developed by the motor, but at advance angles from thirty degrees to sixty degrees, power will increase, and it will increase more as blanking angles are reduced from sixty degrees towards zero degrees. For speeds at 2× base speed and greater, and for an advance angle of thirty degrees to sixty degrees, the blanking angle may be advantageously selected according to the following relationship:

$$\theta_b = 120° - 2(\theta_a)$$

The invention is not limited, however, to this operating relationship.

This has been a description of the preferred embodiment of the circuit and method of the present invention. The invention is intended to encompass additional embodiments including modifications to the details described above which would nevertheless come within the scope of the following claims.

We claim:

1. A circuit for controlling a three-phase machine having a stator with stator windings and a rotor with surface-mounted permanent magnets, the circuit comprising:

a plurality of primary commutation switches which are connected to supply power to the stator windings;

a plurality of diodes, each in parallel connection to a respective one of said primary commutation switches for allowing conduction of current in a reverse direction to bypass each respective primary commutation switch;

a plurality of commutation control switches connected in series with the parallel connection of the diodes to the primary commutation switches, said commutation control switches being operable to turn off motor current when a current half cycle reaches a zero crossing point; and a controller electrically connected to the commutation control switches and to the primary commutation switches, wherein said controller controls a phase advance conduction angle and a conduction period until turn off of the primary commutation switches relative to the point where a supply voltage is equal to the back emf, such that the motor may be operated at speeds above base speed with suitable power.

2. The circuit of claim 1, wherein the controller controls conduction of the primary commutation switches relative to the point where a supply voltage is equal to the back emf, such that the motor is operated in a motoring mode.

3. The circuit of claim 1, wherein the controller controls conduction of the primary commutation switches relative to the point where a supply voltage is equal to the back emf, such that the motor is operated in a regenerating mode.

4. The circuit of claim 1, wherein the controller controls conduction of the primary commutation switches, such that the motor is operated up a speed which is six times base speed or higher.

5. The circuit of claim 1, wherein the primary commutation switches are IGBT's.

6. The circuit of claim 1, wherein the commutation control switches are pairs of SCR's connected in opposite polarity and in parallel.

7. The circuit of claim 1, wherein the motor is a permanent magnet synchronous motor and wherein the back emf has a sinusoidal waveform.

8. The circuit of claim 1, wherein the motor is a brushless DC motor and wherein the back emf has a trapezoidal waveform.

9. The circuit of claim 1, wherein the magnitude of the phase advance conduction angle is sixty degrees or less.

10. The circuit of claim 1, wherein a magnitude of the blanking angle which limits time of conduction of the primary commutation switches during each half cycle is sixty degrees or less.

11. The circuit of claim 1, wherein the controller includes a microelectronic processor which executes a control program.

12. A method of controlling a three-phase machine having a stator with stator windings and a rotor with surface mounted permanent magnets, the method comprising:

turning on in sequence a plurality of primary commutation switches connected to supply power to the stator windings;

blocking current in a positive direction relative to each of the respective commutation switches, while allowing conduction of current in a reverse direction relative to each of the respective primary commutation switches;

transmitting turn on signals to the primary commutation switches at a phase advance angle in relation to the time that a supply voltage is equal to the back emf, such that the motor may be operated at speeds above base speed with suitable power; and transmitting signals to a plurality of commutation control switches to limit conduction of current through the primary commutation switches and the diodes to limited times at speeds above base speed.

13. The method of claim 12, wherein the phase angle difference is in advance of the time that supply voltage is equal to the back emf.

14. The method of claim 12, wherein the motor is a permanent magnet synchronous motor and wherein the back emf has a sinusoidal waveform.

15. The method of claim 12, wherein the motor is a brushless DC motor and wherein the back emf has a trapezoidal waveform.

16. The method of claim 12, wherein a magnitude of the phase advance conduction angle is sixty degrees or less.

17. The method of claim 12, wherein a magnitude of a blanking angle which limits time of conduction of the primary commutation switches during each half cycle is sixty degrees or less.

* * * * *